(12) United States Patent
Guethe et al.

(10) Patent No.: US 9,170,023 B2
(45) Date of Patent: Oct. 27, 2015

(54) OPERATION OF A GAS TURBINE

(75) Inventors: Felix Guethe, Basel (CH); Jonas Hurter, Baden (CH); Giovanni Cataldi, Zurich (CH); Gijsbertus Oomens, Nussbaumen (CH); Manfred Wirsum, Baden-Daettwil (CH); Franz Joos, Hamburg (DE)

(73) Assignee: ALSTOM TECHNOLOGY LTD., Baden (CH)

( * ) Notice: Subject to any disclaimer, the term of this patent is extended or adjusted under 35 U.S.C. 154(b) by 1810 days.

(21) Appl. No.: 12/414,361

(22) Filed: Mar. 30, 2009

(65) Prior Publication Data

US 2009/0249792 A1 Oct. 8, 2009

(30) Foreign Application Priority Data

Apr. 3, 2008 (EP) ..................................... 08154003

(51) Int. Cl.
| | |
|---|---|
| *F02C 9/00* | (2006.01) |
| *F23R 3/34* | (2006.01) |
| *F02C 6/00* | (2006.01) |
| *F02C 7/228* | (2006.01) |
| *F02C 9/28* | (2006.01) |
| *F23C 6/04* | (2006.01) |
| *F23L 7/00* | (2006.01) |
| *F23N 5/00* | (2006.01) |

(52) U.S. Cl.
CPC . *F23R 3/34* (2013.01); *F02C 6/003* (2013.01); *F02C 7/228* (2013.01); *F02C 9/28* (2013.01); *F23C 6/04* (2013.01); *F23L 7/00* (2013.01); *F23N 5/00* (2013.01); *F23L 2900/07002* (2013.01); *F23L 2900/07009* (2013.01); *F23N 2021/10* (2013.01); *F23N 2025/08* (2013.01); *F23N 2041/20* (2013.01)

(58) Field of Classification Search
USPC .......... 60/39.3, 39.281, 39.55, 728, 733, 734, 60/772, 773, 774, 775, 791
See application file for complete search history.

(56) References Cited

U.S. PATENT DOCUMENTS

| | | | | |
|---|---|---|---|---|
| 2,678,531 | A | * | 5/1954 | Miller .............................. 60/775 |
| 4,152,108 | A | * | 5/1979 | Reed et al. ..................... 431/188 |

(Continued)

FOREIGN PATENT DOCUMENTS

| | | |
|---|---|---|
| DE | 195 35 370 A1 | 3/1997 |
| EP | 0 620 362 A1 | 10/1994 |

(Continued)

OTHER PUBLICATIONS

European Search Report dated Oct. 13, 2008.

*Primary Examiner* — Steven Sutherland
(74) *Attorney, Agent, or Firm* — Buchanan Ingersoll & Rooney PC

(57) ABSTRACT

Provided is a control method for a gas turbine plant having a first and a second combustors in series, such that combustion gases produced in the first combustor flows into the second combustor. The second combustor having a fuel lance with internal partitions, for injecting at least one fuel and a gas having a mixture of inert gas and support air into the second combustor. The partitions enable the gas to carry, and/or veil, at least one of the fuels as the fuel exits the lance. A variable of the second combustor is measured and the inert gas to support air mixture varies in response to variations of the variable so as to at least partially compensate for the operational effects of the variable on the operation of the second combustor.

20 Claims, 1 Drawing Sheet

(56) References Cited

U.S. PATENT DOCUMENTS

| | | | |
|---|---|---|---|
| 5,329,758 A * | 7/1994 | Urbach et al. | 60/775 |
| 5,454,220 A | 10/1995 | Althaus et al. | |
| 5,617,718 A | 4/1997 | Althaus | |
| 5,689,948 A | 11/1997 | Frutschi | |
| 6,270,338 B1 | 8/2001 | Eroglu et al. | |
| 6,502,403 B1 | 1/2003 | Tazaki et al. | |
| 6,595,003 B2 * | 7/2003 | Dalla Betta et al. | 60/777 |
| 7,216,486 B2 | 5/2007 | Doebbeling et al. | |
| 2004/0226299 A1 * | 11/2004 | Drnevich | 60/772 |
| 2006/0196190 A1 * | 9/2006 | Arar et al. | 60/773 |
| 2007/0003897 A1 * | 1/2007 | Koizumi et al. | 431/354 |
| 2007/0033918 A1 * | 2/2007 | Benz et al. | 60/39.12 |
| 2007/0227154 A1 | 10/2007 | Pelini | |

FOREIGN PATENT DOCUMENTS

| | | |
|---|---|---|
| EP | 0 911 583 A1 | 4/1999 |
| GB | 2 001 161 A | 1/1979 |
| WO | WO 2007/017406 A1 | 2/2007 |
| WO | WO 2007/113074 A1 | 10/2007 |

* cited by examiner

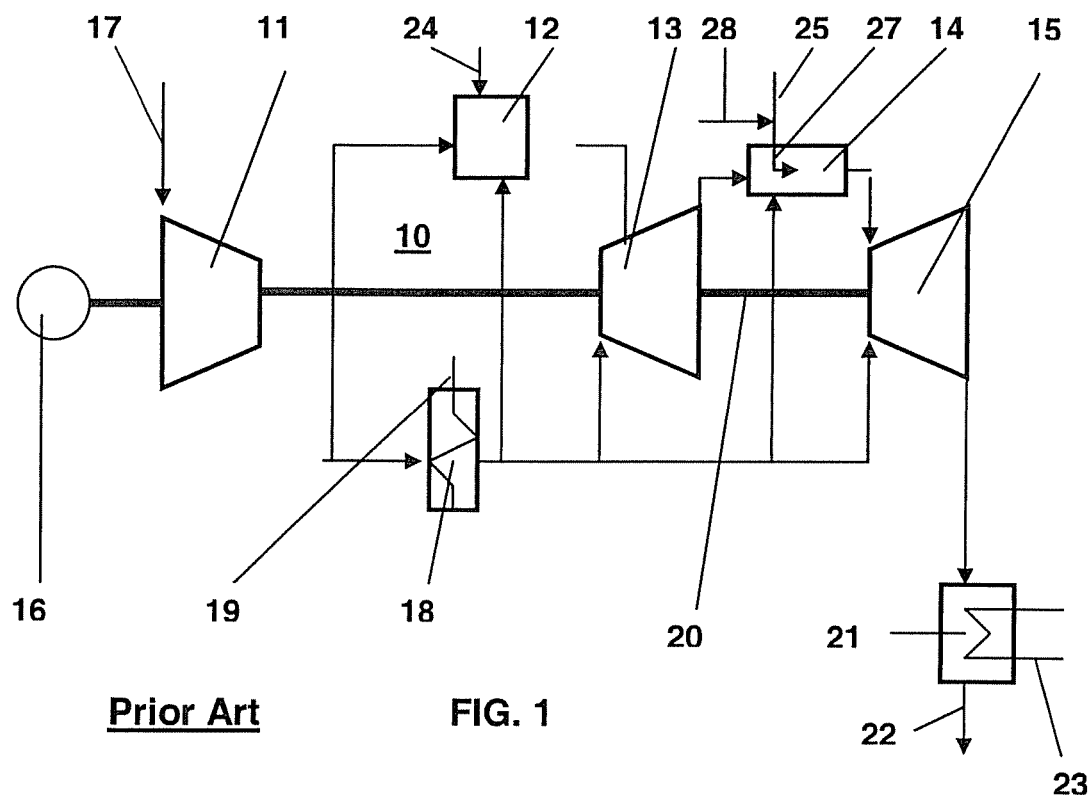
Prior Art  FIG. 1
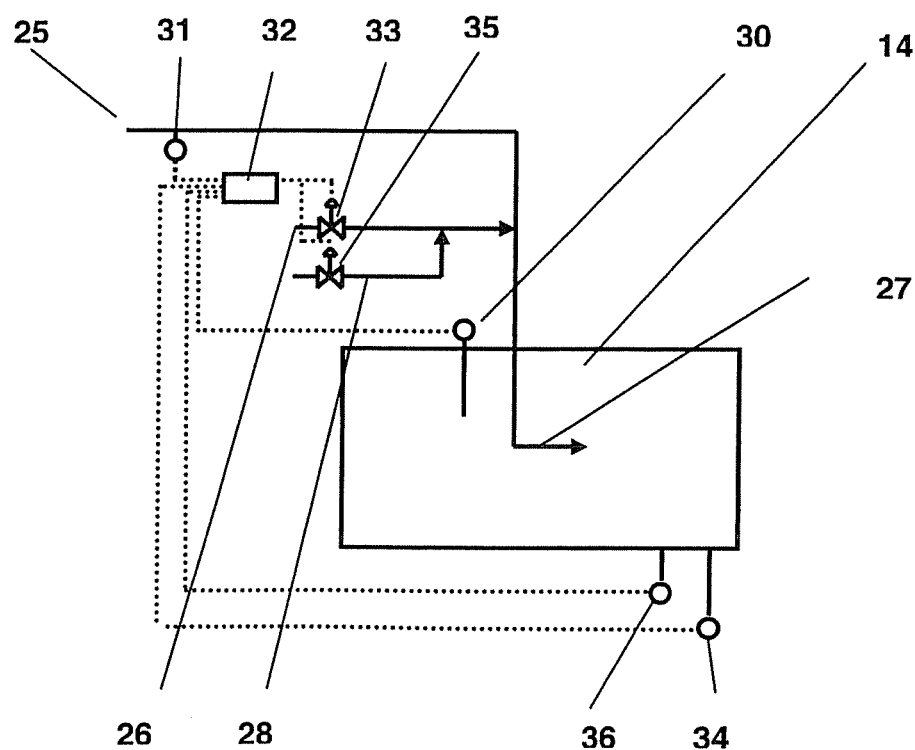
FIG. 2

OPERATION OF A GAS TURBINE

FIELD OF THE INVENTION

The invention relates to control of a gas turbine plant. More particularly the invention relates the operation of a second self-ignition type combustor of a two-combustor gas turbine plant.

STATE OF THE ART

A gas turbine plant of the type described in EP 0620 362 is shown in FIG. 1. The plant comprises a compressor 11 for compressing combustion air for use in a first high pressure combusting chamber 12 fitted with conventional burners and for support air for the fuel injection lance of a series second combustor 14. The partially combusted air passes through a high pressure turbine 13 before flowing furthering into a second combusting chamber 14 where combustion occurs as by self ignition means. In this chamber fuel 23 is added to unburnt air from the first combustor 12 via a lance The hot gases pass through a lower pressure turbine 15 before passing through a heat recovery steam generator 21 The compressor, 11 turbines 2,13 and a generator 16 for generating electricity are connected together by a shaft 20.

The second combustor includes several design features unique to self-ignition combustors that maintain flame stability and prevent flashback. The features include special fuel lance design, combustor layout and gas back-mixing elements. Even so flame stability is affected by fuel composition variation. Fuels often comprise mixes containing not only methane but also higher alkanes such as ethane, butane and propane in variable proportions. To overcome the problem of fuel variation fuel composition limits are imposed on the second combustor, limiting operational flexibility and/or, as taught in U.S. Pat. No. 7,216,486, varying of the fuel feed rate, disadvantageously affecting power output.

A fuel lance and method is provided by WO2007/113074 A1 that enables the lance to operate with different fuels including Syngas by providing the fuel lance with an outer partition carrying a fixed flow of either air or steam that veils the fuel.

Combustor temperature can be an indicator of fuel composition. As discussed in U.S. Pat No.5,617,718 a method of controlling temperature includes varying fuel rate once again disadvantageously affecting power output.

Another important performance parameter of a combustor is NOx emissions. While there are many methods of reducing NOx emissions including steam injection directly into the combustion gases some NOx is always produced. There is therefore a need for other alternative methods of controlling NOx generation.

GB A 2 001 161 teaches of a conventional burner configured to mix low pressure steam and primary combustion air with fuel prior to entering a combustion zone to control NOx generation.

Starting of a gas turbine plant is a stepped process starting from the first plant unit progressing to the last steam generator unit. As described in U.S. Pat. No. 5,689,948 it is beneficial to add steam of the process however during the start-up process steam from the generator is not available reducing plant efficiency.

SUMMARY OF THE INVENTION

The invention is intended to provide a control method for controlling flame characteristics of the second combustor of a two-combustor turbine plant overcoming or at least ameliorating the disadvantages and shortcomings of the prior art or at least provide a useful alternative.

This problem is solved by means of the subject matters of the independent claims. Advantageous embodiments are given in the dependant claims.

The invention is based on the general idea of controlling an inert gas/air mixture used to veil or carry fuel as the fuel is injected via a lance into a second gas turbine plant combustor chamber in consideration of measurements of a variable of the second combustor.

Accordingly an aspect of the invention provides a control method for a gas turbine plant having first and second combustors in series, such that combustion gases produced in the first combustor flow into the second combustor, the second combustor having: a fuel lance with internal partitions for injecting at least one fuel and a gas comprising a mixture of inert gas and support air into the combustor whereby the partitions enables the gas to carry, to veil, or to both carry and veil at least one of the fuels as the fuel exits the lance The control method comprises the step of measurement of a variable of the second combustor and characterized by the step of varying the inert gas to air mixture in response to variations in the variable so as to at least partially compensate for the operational effects of the variable on the operation of the second combustor so as to widen the operating window of the combustor.

In one aspect the gas veils at least one of the fuels as it exits the lance as veiling providing improved combustion control and greater ability to influence self-ignition and flame stability as compared to dilution of the total second combustor feed gas by direct injection into the bulk flow.

In another aspect the variable is the composition of at least one fuel and therefore provides a means to increase the range of fuels and/or fuel compositions as well as fuel rate that can be used to operate the second combustor. In order to provide timely control and reaction to variations the fuel composition is measure by an online analyser and the mixture of inert gas and air is varied by an automated control loop taking the analyser output as a control input.

In another aspect the variable is process gas temperature and the mixture is varied by an automated control loop taking process gas temperature as an input so as to provide another control variable to stabilise second combustor operation due to temperature variation.

In another aspect the inert gas is steam and in a further aspect the NOx concentration in process gas from the second combustor wherein further the steam to air mixture is varied by an automated control loop based on the NOx concentration. In this way another control method for controlling NOx is provided. In yet a further aspect the variable is pulsation in process gas from the second combustor wherein further said steam to air mixture is varied by an automated control loop based on pulsation. NOx analysers can be unreliable and so providing an alternative means to controlling NOx based on the relationship that NOx concentration increases with pulsation provides increase reliability. In this way it is possible to operating closer to pulsation limits without exceeding NOx targets.

In yet another aspect the gas turbine plant further includes: a compressor for pressuring air for the first combustor and the lance; and a heat exchanger for cooling air to the lance wherein the steam is sourced from the heat exchanger. In this way a method is provided that enables the provision of steam during the start-up process before the steam generator is brought online.

In yet another aspect the inert gas is nitrogen and in yet another aspect the inert gas is $CO_2$. Due to environmental pressures there is an increasing desire to capture $CO_2$ generated from combustion however there are no known uses for $CO_2$ in the operation of a gas turbine plant. The method therefore provides a new use that takes advantage of the inert properties of the gas.

Other objectives and advantages of the present invention will become apparent from the following description, taken in connection with the accompanying drawings wherein by way of illustration and example, an embodiment of the invention is disclosed.

BRIEF DESCRIPTION OF THE DRAWINGS

By way of example, an embodiment of the invention is described more fully hereinafter with reference to the accompanying drawings, in which:

FIG. 1 is a simplified schematic of known a gas turbine plant with two combustors suitable used for the realization of the invention; and FIG. 2 is a schematic diagram the second combustor of FIG. 1 showing an application of a preferred embodiment of the invention.

DETAILED DESCRIPTION OF THE INVENTION

Preferred embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate description of the invention.

FIG. 2 shows details of a second combustor 14 of a gas turbine plant 10 of the type described in EP 0 620 362 and shown in FIG. 1. The second combustor 14 typically compromises a combustor chamber with a fuel lance 27 of the type known in the art for injecting fuel 25 together with a support air 28 for carrying or veiling the fuel. The support air 28 typically comprises air although other gases are also typically used. Partitioning of the fuel 25 and gas flow 28 within the lance 27 and introduction of the fuel 25 and support air 28 into the combustor 14 via a series of nozzles and apertures typically achieves veiling of the fuel 25.

In a preferred embodiment of the invention as shown in FIG. 2 an inert gas 26 is combined with support air 28 so as to combine the two gases before injection into a second combustor 14. Inert gas in terms of this invention is defined as a gas without free oxygen. A measurement device is used to measure a variable of the second combustor 14, such as fuel gas composition 31, combustor temperature 30, combustor exit NOx concentration 34, pulsation 36 or any combination of these or other variables, for the input to a controller 32, that adjusts the inert gas 26 flow rate by means of a control valve 33. An additional output from the controller maybe provided that further controls the support air 28 via a control valve 35 so as to broaden the inert gas 26 to support air 28 ratio control capability.

Preferably the inert gas 26 combined with support air 28 veils combustor fuel 25 as it is injected into the second combustor 14, so as to enhance the effect of the inert gas 26 in the controlling of the combustion process. It does this by providing a barrier between hot combustion gases containing oxygen from the first combustor 12 and the injected fuel. The inert gas 26 is preferably steam as steam appears to provide additional shielding of the fuel and flame stability above that what would be expected for a pure inert gas assumed to be as a result of quenching of oxygen radicals to form less reactive OH radicals. Alternative an inert gas as nitrogen or $CO_2$ could be used with advantage over air due to the absence of oxygen. The steam is preferably sourced from the steam generator 21, air cooler 18, shown in FIG. 1, or any other steam source.

Although the invention has been herein shown and described in what is conceived to be the most practical and preferred embodiment, it is recognized that departures can be made within the scope of the invention, which is not to be limited to details described herein but is to be accorded the full scope of the appended claims so as to embrace any and all equivalent devices and apparatus.

REFERENCE NUMBERS

10 Gas turbine plant
11 Low-pressure compressor
12 First combustion chamber
13 High-pressure turbine
14 Second combustion chamber
15 Low-pressure turbine
16 Generator
17 Air
18 Air cooler
19 Steam generated from air cooler
20 Shaft
21 Steam generator
22 Exhaust gases
23 Steam from steam generator
24 First Combustor fuel feed
25 Second Combustor fuel feed
26 Inert Gas
27 Second combustor lance
28 Support air
30 Secondary Combustor Temperature
31 Fuel analyzer
32 Controller
33 Inert gas control valve
34 Secondary Combustion gas analyzer
35 Support air control valve
36 Secondary combustor pressure pulsation

The invention claimed is:

1. A control method for a gas turbine plant, the control method comprising:
   supplying combustion gas from a first combustor of a gas turbine plant into a second combustor connected in series with the first combustor;
   injecting at least one fuel and a gas comprising a mixture of inert gas and support air into said second combustor using a fuel lance with internal partitions which enable said gas to carry, to veil, or to both carry and veil said at least one fuel as said at least one fuel exits said fuel lance;
   measuring a variable of said second combustor; and
   varying a relative concentration of said inert gas and said support air in said mixture of inert gas and support air in response to variations in said variable so as to at least partially compensate for operational effects of said variable on the second combustor.

2. The method of claim 1, comprising:
   veiling the at least one fuel with the gas as said at least one fuel exits the fuel lance.

3. The method of claim 1, wherein said variable is a fuel composition of the at least one fuel.

4. The method of claim 3, comprising:
measuring the fuel composition of the at least one fuel by an online analyzer; and
varying said mixture of inert gas and support air by an automated control loop using an output from said online analyzer as an input.

5. The method of claim 1, wherein said variable is a process gas temperature, the method comprising:
varying the mixture of inert gas and support air by an automated control loop taking the process gas temperature as an input.

6. The method of claim 1, wherein the inert gas is steam.

7. The method of claim 6, comprising:
pressurizing air for said first combustor and said fuel lance; and
cooling said support air to said fuel lance, wherein said steam is sourced from a heat exchanger.

8. The method of claim 1, wherein the inert gas is steam and the variable is an NOx concentration in a process gas as it exits the second combustor, the method comprising;
varying the steam to air mixture by an automated control loop based on said NOx concentration.

9. The method of claim 1, wherein the inert gas is steam and the variable is pulsation in process gas from said second combustor, the method comprising:
varying the steam to air mixture by an automated control loop based on pulsation.

10. The method of claim 1, wherein said inert gas is nitrogen.

11. The method of claim 1, wherein said inert gas is $CO_2$.

12. A gas turbine plant comprising:
a first combustor;
a second combustor connected in series with the first combustor to receive combustion gas flow from the first combustor, the second combustor having a fuel lance with internal partitions;
at least one of a fuel supply and a supply of gas connected to the second combustor via the internal partitions of the fuel lance, the gas having a mixture of inert gas and supply air; and
a control unit connected to the supply of gas for varying a relative concentration of said inert gas and said support air in said mixture of inert gas and support air in response to a measured variable of the second combustor to compensate for operational effects of the measured variable on the second combustor.

13. A gas turbine plant of claim 12, wherein said measured variable is a fuel composition of the at least one fuel.

14. A gas turbine plant of claim 13, comprising:
measuring the fuel composition by an online analyzer; and
varying said mixture of inert gas and support air by an automated control loop using an output from said online analyzer as an input.

15. A gas turbine plant of claim 12, wherein said measured variable is a process gas temperature, the gas turbine plant comprising:
an automated control loop for varying the mixture by taking the process gas temperature as an input.

16. A gas turbine plant of claim 12, wherein the inert gas is steam.

17. A gas turbine plant of claim 12, wherein the inert gas is steam and the measured variable is an NOx concentration in a process gas as it exits the second combustor, the gas turbine plant comprising;
an automated control loop for varying the steam to air mixture based on said NOx concentration.

18. A gas turbine plant of claim 12, wherein the inert gas is steam and the measured variable is pulsation in process gas from said second combustor, the gas turbine plant comprising:
an automated control loop for varying the steam to air mixture based on pulsation.

19. A gas turbine plant of claim 12, comprising:
a heat exchanger for sourcing steam as the inert gas.

20. A gas turbine plant of claim 12, wherein the inert gas is one of nitrogen and $CO_2$.

* * * * *